1,436,333

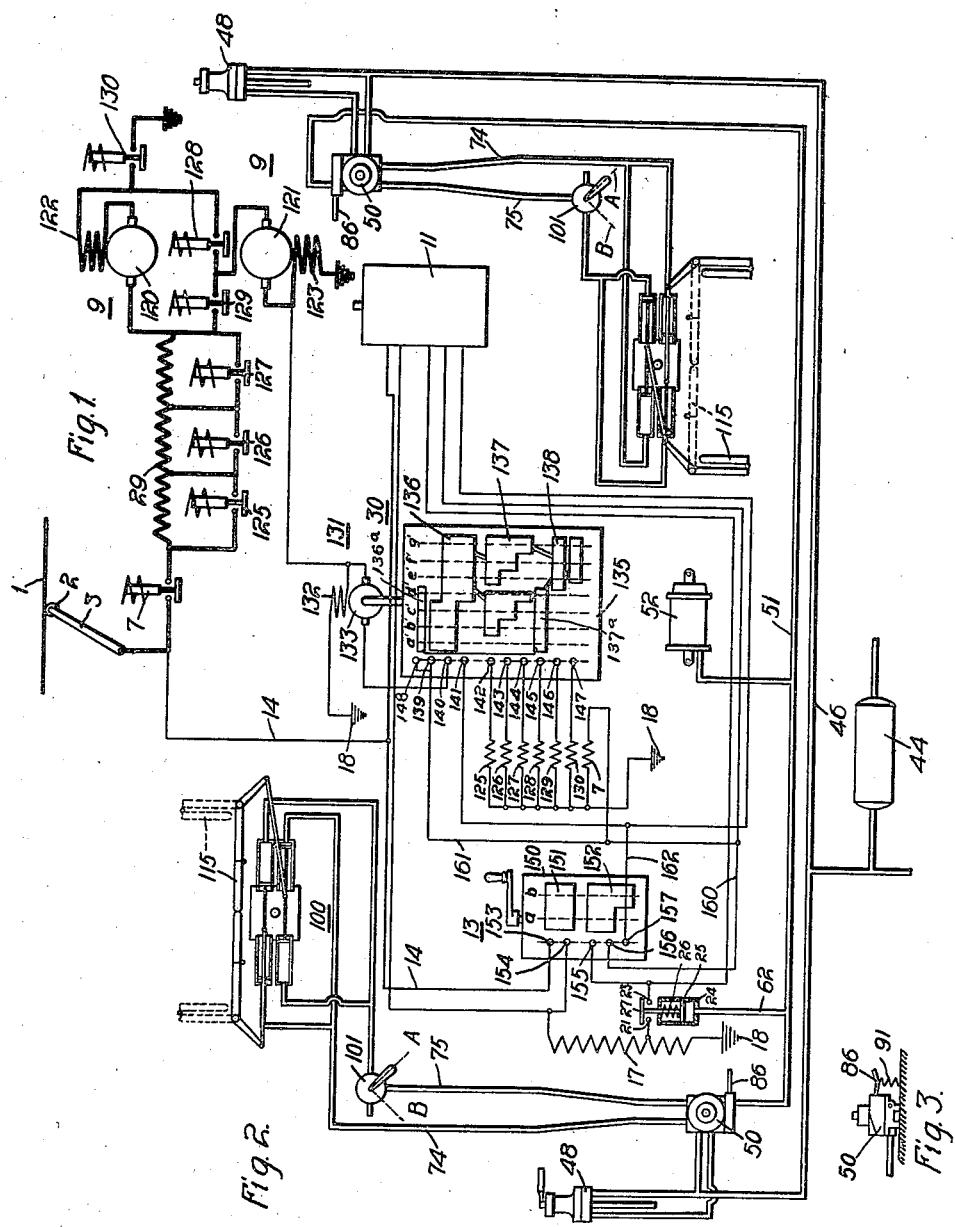
H. A. BENEDICT AND E. M. MOLLER.
CONTROL APPARATUS.
APPLICATION FILED NOV. 4, 1921.
1,436,333.
Patented Nov. 21, 1922.
INVENTORS
Hershel A. Benedict &
Edvard M. Moller.
BY
ATTORNEY Patented Nov. 21, 1922.

UNITED STATES PATENT OFFICE.

HERSHEL A. BENEDICT, OF EAST ORANGE, AND EDVARD M. MOLLER, OF JERSEY CITY, NEW JERSEY.

CONTROL APPARATUS.

Application filed November 4, 1921. Serial No. 512,933.

*To all whom it may concern:*

Be it known that we, HERSHEL A. BENEDICT, a citizen of the United States, and a resident of East Orange, in the county of Essex and State of New Jersey, and EDVARD M. MOLLER, a citizen of the United States, and a resident of Jersey City, in the county of Hudson and State of New Jersey, have invented a new and useful Improvement in Control Apparatus, of which the following is a specification.

Our invention relates to systems of control for dynamo-electric machines and it has special relation to systems employed for controlling the operation of electric railway vehicles and the like.

One object of our invention is to provide foot-operated means for pneumatically controlling a car brake and a car door directly, together with a controller for predetermining the degree of acceleration of the car-propelling motor or motors and a relay device governed by the foot-operated means for rendering the controller operative to effect movement of the motor.

Another object of our invention is to provide a system of the character set forth wherein the foot-operated means is biased toward a position corresponding to inoperativeness of the controller, application of the brake and opening of the door.

Our invention may best be understood by reference to the accompanying drawing,

Fig. 1 of which is a diagrammatic view of the main circuits of a system of control embodying our invention;

Fig. 2 is a diagrammatic view of the auxiliary electric circuits and of the pneumatic system with which our invention is associated, and Fig. 3 is a diagrammatic view of a portion of the control apparatus that is shown in Fig. 2.

Referring particularly to the pneumatic system that is shown in Fig. 2, a brake cylinder 52 and a car door 115 are adapted to be pneumatically controlled through the agency of an engineer's valve 48 of a familar type and a foot valve 50 (see also Fig. 3). A pneumatic relay 27 is also adapted to be controlled through the agency of the engineer's valve 48 and the foot valve 50 for governing the circuit of the main controlling switch of the electrical system.

A suitable reservoir 44 of fluid pressure is connected to the usual line of piping or reservoir line 46 whereby air under pressure is admitted to the engineer's valves 48 on the respective car platforms. The brake cylinder 52 communicates with a second line of piping 51, known as the train line, which is connected directly to the foot valves 50 on the respective platforms.

The general control operations of the foot valve are fully set forth and claimed in our copending application, Serial No. 512,924, filed Nov. 4, 1921, and the structure of the foot valve is described and claimed in another copending application, Serial No. 512,934, filed Nov. 4, 1921. Consequently, only a brief description of these features will be necessary in the present application.

It will be sufficient to say that downward pressure upon the foot-valve lever 86 by the motorman's foot will serve to effect release of the pressure from the brake cylinder 52 and will also effect the closing operation of the pneumatic relay 27 and the closure of the doors 115 through the agency of any suitable pneumatic door-engine 100, the pipe 74 corresponding to the closure of the door 115 and the pipe 75 to the opening operation thereof.

On the other hand, release of such foot pressure allows a biasing spring 91 (see Fig. 3) to immediately return the foot-valve to the "emergency" position, whereby fluid pressure is admitted to the brake cylinder to set the vehicle brakes, open the motor circuit by means of the pneumatic relay 27 and also open the car doors.

A three-way valve 101 is provided in the opening pipe 75 whereby manual operation of the valve from the normal position A to position B will effect release of the air pressure from the pneumatic engine, independent of the operation of the foot valve 50. In this way, in case of emergency, any passenger may operate the three-way valve 101 to effect pneumatic unlocking of the door-engine, whereby manual pressure upon the doors will effect the opening thereof.

The pneumatic relay 27 is adapted to bridge a plurality of stationary contact members 21 and 23, as subsequently described in detail, being normally biased to such closed position by means of a helical spring 26 that operates upon a piston 25 acting within a suitable cylinder 24. A pipe 62 serves to connect the train-line pipe 51 to the cylinder 24.

Consequently, in addition to the release of the air-brakes and the closure of the car door when the foot-valve plunger is depressed by the motorman, air is also released from the pneumatic cylinder 24 to permit the spring 26 to effect closure of the relay 27. In this way, the electrical controlling system for the car-propelling motors is rendered operative, as subsequently more fully set forth.

On the other hand, upon the accidental or intentional release of the foot-valve lever 86 by the motorman, the biasing spring 91 (see Fig. 2) acts to admit fluid pressure, through the foot-valve 50, to the train line pipe 51, whereby the presence of fluid pressure in the cylinder 24 causes the opening of the pneumatic relay 27 and, therefore, the de-energization of the car-propelling motors. At the same time, fluid pressure is admitted to the brake cylinder 52 to effect the application of the car brakes. Furthermore, the air pressure is admitted to the opening pipe 75 of the pneumatic door-engine to effect the opening movement of the car doors 115 to the position indicated by the dotted lines.

The main or propelling-motor system that is shown in Fig. 1 comprises a line switch 7, an accelerating resistor 29, with which is associated a plurality of suitable short-circuiting switches 125, 126 and 127, two propelling motors 9, which respectively comprise commutator-type armatures 120 and 121 and corresponding field windings 122 and 123, a series-connecting switch 128, a parallel-connecting switch 129 and a ground switch 130.

It will be understood that the system just outlined is here shown for illustrative purposes only and that any other suitable propelling-motor system may be employed if desired.

The sequence switch 30 is of a familiar type embodying a pilot motor 131 having a field winding 132 and an armature 133 for driving a suitable drum controller 135.

A plurality of suitably configured contact segments 136, 136a, 137, 137a and 138 are disposed upon the drum 135 to selectively engage a plurality of control fingers 139 to 148, inclusive, for purposes to be set forth.

The sequence switch 30 constitutes no part of our present invention in itself, being preferably of the well-known type set forth in a copending application of Bascum O. Austin, Serial No. 328,847, filed Oct. 6, 1919, and assigned to the Westinghouse Electric & Manufacturing Company.

The field winding 132 for the sequence-switch motor 131 is connected in parallel relation to the field winding 123 of one of the propelling motors, whereby the operating speed of the sequence switch 30 is limited to a desirably low value. In this way, the automatic acceleration of the propelling motors may be accomplished without the aid of any current relay, or the like, as fully explained in the above-identified copending application.

The master controller 13 may comprise a suitable drum 150, upon which is mounted a plurality of contact segments 151 and 152 for selectively engaging a plurality of control fingers 153 to 157, inclusive, as hereinafter more fully described.

The detailed operation of the illustrated control systems may be set forth as follows: When the master controller 13 is actuated to its initial position $a$, corresponding to series operation of the propelling motors 9, a control circuit is established from the trolley-wire 1 through conductor 14, control fingers 153 and 154, which are bridged by contact segment 151 of the controller 13, through conductor 16 and control resistor 17, to the ground connection 18.

Assuming that the pneumatic relay 27 has been actuated to its closed position, as previously set forth, a further circuit is established, in position $a$ of the controller 13, from an intermediate tap of the resistor 17 through the contact members of the pneumatic relay, control fingers 155 and 156, which are bridged by contact segment 152 of the controller 13, and thence, through conductor 160, to the actuating coil of the line switch 7. A further circuit is simultaneously established through control fingers 139 and 148 and contact segments 136a and 137a to the actuating coil of the series-connecting switch 128. Consequently, the switches 7 and 128 are closed to connect the propelling motors 9 in series relation with the accelerating resistors 29 across the supply circuit, as will be evident without detailed tracing of the main circuit.

At the same time, a branch 161 of the conductor 160 becomes energized to establish a circuit through control fingers 139 and 140, which are bridged by contact segment 136 of the sequence switch 30, whence circuit is continued through armature 133 and field winding 132 of the sequence switch motor to the ground conductor 18.

Since the armature 133 is energized in accordance with the circuit just traced, while the field winding 132 receives its principal energization from the field winding 122 of one of the propelling motors, it follows that the sequence switch 30 is rotated from its initial position $a'$ into its second position $b'$ at a rate that is dependent upon the amount of current traversing the main field winding 122.

In position $b'$, control finger 142 engages contact segment 137, whereby the actuating coil of the resistor-shunting switch 125 is energized. The switch 125 is thus closed to short-circuit a predetermined section of the starting resistor 29 and thereby effect an increase of the operating speed of the propelling motors.

In a similar manner, control fingers 143 and 144, respectively, become energized in positions $c'$ and $d'$ of the sequence switch to effect successive closure of the resistor-shunting switches 126 and 127. In position $d'$ of the sequence switch, therefore, the propelling motors 9 are connected in full series relation.

The sequence switch 30, under the conditions assumed, namely, the occupation of position $a$ by the master controller 13, will remain in its series position $d'$ by reason of the disengagement of the control finger 139 from the contact segment 136.

To effect further acceleration of the propelling motors, the master controller 13 may be actuated to its final operating position $b$, whereby a new circuit is established from the contact segment 152 through control finger 157, conductor 162, control fingers 141 and 140, which are bridged by contact segment 136 of the sequence switch 30, and thence through the sequence switch motor, as previously traced.

The sequence switch is thus gradually actuated to its successive positions $e'$, $f'$ and $g'$, in accordance with the amount of current traversing the main circuit.

It will be noted that, when the sequence switch 30 leaves its position $d'$, certain circuit changes are effected, one being the opening of the resistor-shunting switches 125, 126 and 127, by reason of the disengagement of contact segment 137 from the corresponding control fingers. Furthermore, control finger 146 is engaged by contact segment 138 to close the parallel-connecting switch 129, thereby temporarily shunting the propelling motor 9 having the armature 120. The control finger 145 next becomes disengaged from contact segment 138 to remove the shunt circuit around that motor by opening the series-connecting switch 128. As the sequence switch 30 approaches its position $e'$, a new circuit is established from the contact segment 138 through control finger 147 and the actuating coil of the ground switch 130.

Consequently, the well-known shunting type of transition is effected by the sequence switch to connect the propelling motors 9 in parallel relation, the starting resistor 29 being connected in mutual series relation with the motors.

In positions $e'$, $f'$ and $g'$, furthermore, control fingers 142, 143 and 144 respectively engage contact segment 137 to effect successive closure of the corresponding resistor-shunting switches 125, 126 and 127. In the final position $g'$ of the sequence switch, therefore, the propelling motors 9 are connected in full parallel relation.

It will be seen that the controller 13 may thus be initially placed in either its series position $a$ or its parallel position $b$ and, upon actuation of the pneumatic relay 27, as previously described, the controller will be rendered active, that is, the sequence switch 30 will become energized to effect automatic acceleration of the propelling motor 9 to the desired ultimate speed, namely, that corresponding to either full series or full parallel connection of the propelling motors.

We do not wish to be restricted to the specific circuit connections or arrangement of parts herein set forth, as various modifications thereof may be effected without departing from the spirit and scope of our invention. We desire, therefore, that only such limitations shall be imposed as are indicated in the appended claims.

We claim as our invention:

1. In a vehicle, the combination with a dynamo-electric machine, a car brake and a car door, of foot-operated means for pneumatically controlling said brake and said door directly, means for predetermining the degree of acceleration of said machine, and a relay device governed by said foot-operated means for rendering said predetermining means operative to effect movement of said machine.

2. In a vehicle, the combination with a dynamo-electric machine, a car brake and a car door, of foot-operated means for pneumatically controlling said brake and said door directly, a plural-position controller for selectively predetermining the final speed of said machine, and a relay device pneumatically governed by said foot-operated means for rendering said selective controller active.

3. In a vehicle, the combination with a plurality of propelling motors, a car brake and a car door, of means for pneumatically controlling said brake and said door, a controller having positions corresponding to series and parallel operation of said motors, and adapted to be preset in any one of such positions, and a relay device pneumatically governed by said means for rendering said controller active.

4. In a vehicle, the combination with a plurality of propelling motors, a car brake and a car door, of means for pneumatically controlling said brake and said door, a controller having positions corresponding to series and parallel operation of said motors, and adapted to be preset in any one of such positions, a switch for closing the motor circuit and having an actuating coil, a source of energy, and a relay device governed by said means for effecting connection of said coil to said source.

5. In a vehicle, the combination with a dynamo-electric machine, a car brake and a car door, of foot-operated means for pneumatically controlling said brake and said door directly, means for predetermining the degree of acceleration of said machine, and a relay device governed by said foot-operated means for rendering said predetermining means operative to effect movement of said machine, said foot-operated means being biased toward a position corresponding to inoperativeness of said predetermining means, application of said brake and opening of said door.

6. In a vehicle, the combination with a dynamo-electric machine, a car brake and a car door, of foot-operated means for pneumatically controlling said brake and said door directly, a plural-position controller for selectively predetermining the final speed of said machine, and a relay device pneumatically governed by said foot-operated means for rendering said selective controller active, said foot-operated means being biased toward a position corresponding to inoperativeness of said controller, application of said brake and opening of said door.

7. In a vehicle, the combination with a plurality of propelling motors and a car brake, of means for pneumatically controlling said brake, a controller having positions corresponding to series and parallel operation of said motors and adapted to be preset in any one of such positions, and a relay device pneumatically governed by said means for rendering said controller active.

8. In a vehicle, the combination with a plurality of propelling motors and a car door, of means for pneumatically controlling said door, a controller having positions corresponding to series and parallel operation of said motors and adapted to be preset in any one of such positions, and a relay device pneumatically governed by said means for rendering said controller active.

In testimony whereof, we have hereunto subscribed our names this 23 day of October, 1921.

HERSHEL A. BENEDICT.
EDVARD M. MOLLER.